Patented Apr. 22, 1941

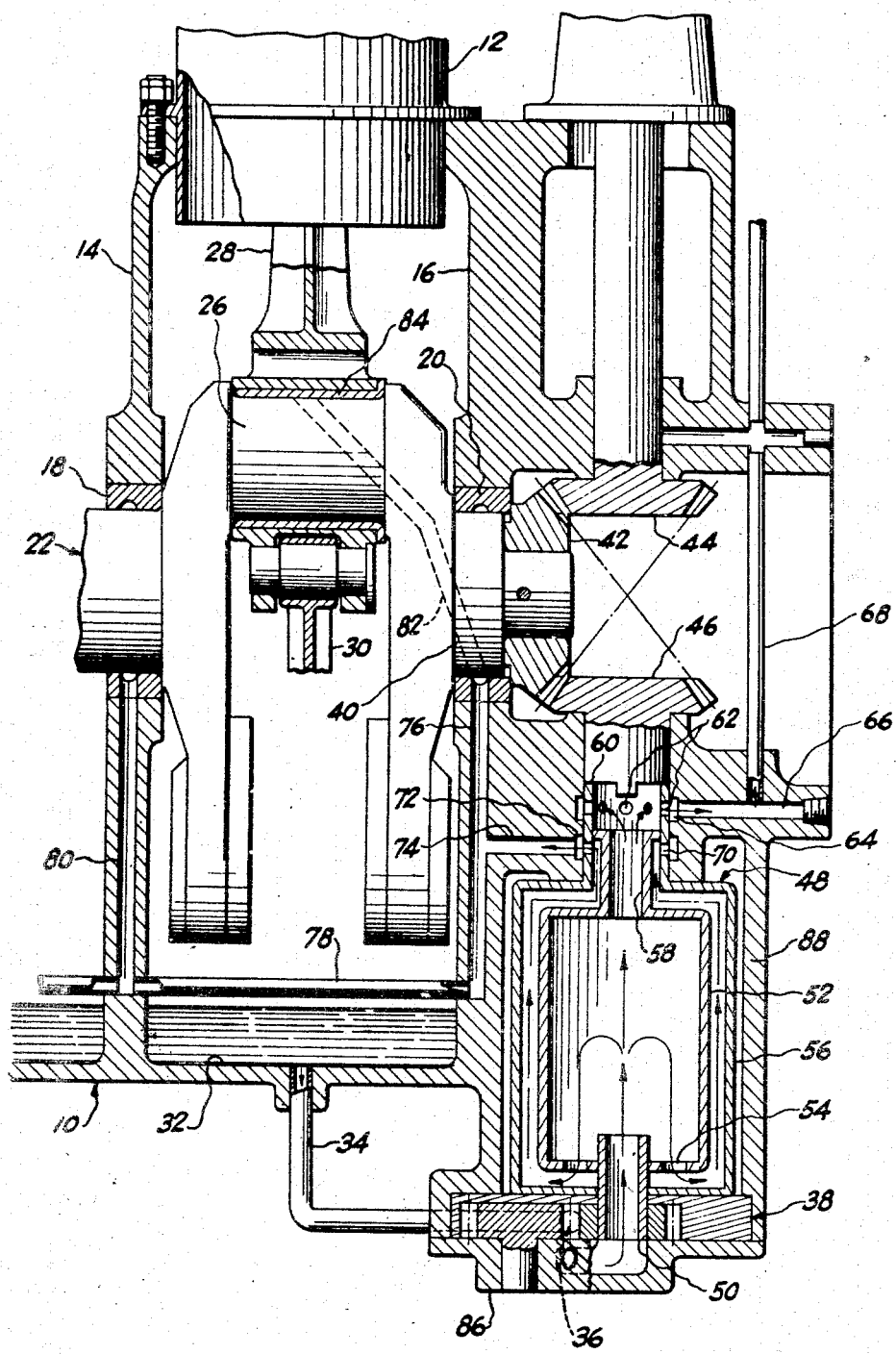

2,239,447

UNITED STATES PATENT OFFICE 2,239,447

ENGINE LUBRICATING SYSTEM

Earle A. Ryder, West Hartford, Conn., assignor to United Aircraft Corporation, East Hartford, Conn., a corporation of Delaware Application November 16, 1939, Serial No. 304,756

12 Claims. (Cl. 184—6)

This invention relates to improvements in engine lubricating systems and has particular reference to an improved lubricating system for an internal combustion type of engine having crankshaft bearings and other lubricated surfaces all supplied with lubricant from the same source such as the engine lubricating oil pump.

An object of the invention resides in the provision of an improved lubricating system of the character indicated in which the lubricant for the crankshaft bearings is separated from the remainder of the lubricant and is specially treated to render it free of dirt and entrained gases.

A further object resides in the provision of an improved lubricating system of the character indicated in which the lubricant for the crankshaft bearings is especially treated to render it free of dirt and entrained gases without loss of fluid pressure on the lubricant.

A still further object resides in the provision in an engine lubricating system of a centrifuge for cleaning the lubricant supplied to the engine crankshaft bearings to free this lubricant of dirt or sludge and entrained gases without loss of fluid pressure on the lubricant and without unnecessarily detracting from the horse-power output of the engine.

Other objects and advantages will be more particularly pointed out hereinafter or will become apparent as the description proceeds.

In the accompanying drawing, in which like reference numerals are used to designate similar parts throughout, there is illustrated a suitable mechainical construction for the purpose of disclosing the invention. The drawing, however, is for the purpose of illustration only and is not to be taken as limiting the invention since it will be apparent to those skilled in the art that various changes in the illustrated construction may be resorted to without in any way exceeding the scope of the invention.

In the drawing, the single figure is a vertical sectional view of a fragmentary portion of an internal combustion engine showing the oil cleaning mechanism of the invention applied thereto.

Referring to the drawing in detail the numeral 10 generally indicates the engine crankcase which carries the cylinders, as indicated at 12, and is provided with transverse partitions 14 and 16 which support main bearings 18 and 20 for the crankshaft, generally indicated at 22. The crankshaft has crankpins, as indicated at 26, upon which are mounted connecting rods as indicated at 28 and 30 in a manner well known to the art. In the lower portion of the crankcase 10 there is provided an oil sump 32 from which lubricating oil may flow through a suitable channel 34 to the inlet 36 of an engine lubricating oil pump, generally indicated at 38. If desired, a storage tank and a scavenging pump may be interposed between the oil sump and engine lubricating oil pump in a manner well known to the art.

Beyond the rear main bearing journal 40 the crankshaft may be provided with an accessory drive gear 42 having a driving connection with two or more gears, two gears 44 and 46 being shown for the purpose of illustrating the invention. The gear 44 may drive some engine accessory such as a magneto, generator, gun synchronizer or other device. The gear 46 has a driving connection with the upper end of a double walled centrifuge, generally indicated at 48, the lower end of which drives the lubricating pump 38 through the hollow shaft 50.

Lubricating oil from the outlet, not illustrated but located on the opposite side of the pump casing from the inlet 36, flows through the hollow shaft 50 into the interior of the inner cylindrical member 52 and is there subjected to centrifugal action which moves the dirt and sludge contained in the oil out against the cylindrical wall of this member and causes the entrained air to move toward the center of the member leaving a body of clean oil between the axis of rotation of the member and the wall thereof. Some of this clean oil flows downwardly through the ports 54 and into the space between the inner cylindrical member 52 and the outer cylindrical member 56 while the remainder of the oil and the entrained gases flow upwardly through the hollow shaft 58 to the upper end of the hollow drive shaft 60 from which the flow is through the ports 62, through the annular channel 64 and oil channels, as indicated at 66 and 68, which channels supply lubricating oil to all wearing surfaces of the engine except the crankshaft bearings.

The partially cleaned oil entering the space between the members 52 and 56 through the ports 54 flows upwardly between these members leaving the remaining entrained dirt on the inner wall of 56 and then flows between the hollow shafts 58 and 60 to ports 70 in the shaft 60 through which it flows into the annular channel 72 from thence through channels 74, 76, 78 and 80 to the crankshaft main bearings 18 and 20. Additional similar channels may be provided to conduct lubricating oil to other main bearings of the crankshaft. From the exterior of the main bearing journal 40 a drilled lead 82 through the crankshaft conducts lubricating oil to the connecting rod bearing 84 and similar leads may be provided from other main bearings to supply other connecting rod bearings.

Since the rate of flow of oil through some types of internal combustion engines is so high, being in the neighborhood of ten gallons per minute for certain types of aircraft engines, it is not feasible to clean all of the lubricating oil since a cleaner of adequate capacity for the entire flow of lubricating oil would run to an unreasonable size and weight and would absorb a disproportionate amount of engine power. It has been found, however, that the crankshaft bearings are usually the critical bearings of the engine and that if these bearings are supplied with clean and gas free oil, danger of engine failure through lubrication difficulties is substantially eliminated. Since the provision of clean oil for the crankshaft bearings can be accomplished with a simple cleaner of reasonable size and weight it has been found desirable to divide the lubricating oil flow, as indicated above, in order to completely clean only the portion of the lubricating oil supplied to the crankshaft bearings. All of the lubricating oil is cleaned in that substantially all of the sludge and heavy impurities are removed but the lubricant for the crankshaft bearings is more thoroughly cleaned than the remainder of the lubricant since this lubricant is also freed of entrained gases and light impurities.

The centrifuge 48 may be periodically cleaned of accumulated sludge and other heavy materials separated from the oil by removing the plate 86 and extracting the centrifuge bodily from its casing 88. If desired, the centrifuge may be made in separable parts to facilitate access to the interior thereof or may be constructed as a relatively cheap replaceable unit after the manner of various oil cleaning or filtering devices now in common use on automotive engines.

While a suitable mechanical embodiment has been hereinabove described and illustrated in the accompanying drawing for the purpose of disclosing the invention it is to be understood that the invention is not limited to the particular construction so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In an engine having crankshaft bearings, and other bearings and friction surfaces, and a lubricating system for supplying lubricant to all of said bearings and friction surfaces, means in said lubricating system for separating the lubricant supplied to said crankshaft bearings from the lubricant supplied to said other bearings and friction surfaces, and means subjecting said crankshaft bearing lubricant to a cleaning process while separated from the remainder of said lubricant.

2. In an engine having crankshaft bearings and other bearings and friction surfaces, and a lubricating system for supplying lubricant to said bearings and friction surfaces, centrifugal means in said lubricating system for receiving the lubricant for said bearings and friction surfaces and for separating the lubricant supplied to said crankshaft bearings from the lubricant supplied to said other bearings and friction surfaces and centrifuging said crankshaft bearing lubricant to free the same of dirt and entrained gases.

3. In an engine having crankcraft bearings and other bearings and friction surfaces, and a lubricating system for supplying lubricant to all of said bearings and friction surfaces, a pressure pump for said lubricating system, centrifugal means connected with said pump outlet for separating the lubricant supplied to said crankshaft bearings from the lubricant supplied to said other bearings and friction surfaces and centrifuging said crankshaft bearing lubricant to free the same of dirt and entrained gases.

4. In an engine having crankshaft bearings and other bearings and friction surfaces, and a lubricating system for supplying lubricant to all of said bearings and friction surfaces, a pressure pump for said lubricating system, and centrifugal means drivingly connected with said pump and hydraulically connected with said pump outlet for separating the lubricant supplied to said crankshaft bearings from the lubricant supplied to said other bearings and friction surfaces and subjecting said crankshaft bearing lubricant to a cleaning process, and a driving connection between said engine and said centrifugal means.

5. The arrangement as set forth in claim 4 in which the centrifugal means is of a size sufficient to thoroughly clean only the lubricant supplied to the crankshaft bearings.

6. The arrangement as set forth in claim 4 in which said centrifugal means is so constructed and arranged that its function of cleaning the lubricant is accomplished without loss of fluid pressure imposed on said lubricant by said pump.

7. In an engine having crankshaft bearings and other bearings and friction surfaces, and a lubricating system for supplying lubricant to all of said bearings and friction surfaces, a centrifuge in said lubricating system for separating the lubricant supplied to said crankshaft bearings from the remainder of said lubricant and subjecting said crankshaft bearing lubricant to a cleaning process, said centrifuge comprising an inner cylindrical member having a coaxial inlet opening at one end, a coaxial outlet opening at the opposite end, and outlet ports at the inlet end of said inner cylindrical member spaced from said inlet opening, and an outer cylindrical member having a closed end opposite said outlet ports and an outlet at the opposite end spaced from the outlet of said inner member.

8. In an engine having parts to be lubricated some of which are more sensitive than others to impurities in the lubricating oil, means for cleaning substantially all the oil fed to the lubricating systems and means for separating the oil to be fed to the sensitive engine parts from the cleaned oil, and means for additionally cleaning said separated oil before feeding it to said sensitive parts.

9. In an engine lubricating system, in combination an oil cleaning mechanism comprising a centrifuge having two compartments, means for feeding oil to one compartment and means for leading oil from said one compartment to engine parts to be lubricated, means for leading oil cleaned in said one compartment to the other compartment, and means for leading oil cleaned in said other compartment to other parts of said engine to be lubricated.

10. In an engine having crankshaft bearings and other bearings and friction surfaces, and a lubricating system for supplying lubricant to all of said bearings and friction surfaces, a pressure pump for said lubricating system, and centrifugal means drivingly connected with said pump and hydraulically connected with said pump outlet provided with two flow compartments, one for crankshaft bearing lubricant and one for other lubricant, and a separate outlet for each compartment, for separating lubricant supplied to said crankshaft bearings from the remainder of said lubricant and subjecting said crankshaft bearing lubricant to a cleaning process.

11. In an engine having crankshaft bearings and other bearings and friction surfaces, and a lubricating system for supplying lubricant to all of said bearings and friction surfaces, a pressure pump for said lubricating system, and a two part centrifuge drivingly connected with said pump and hydraulically connected with said pump outlet, the outer part of said centrifuge being connected with the crankshaft bearings to supply gas free and dirt free lubricant thereto and the inner portion of said centrifuge to which the entrained gases are forced by centrifugal action being connected with the remainder of the engine lubricating system.

12. In an engine having crankshaft bearings and other bearings and friction surfaces, and a lubricating system for supplying lubricant to all of said bearings and friction surfaces, a pressure pump for said lubricating system, and centrifugal means drivingly connected with said pump and hydraulically connected with said pump outlet and having a single lubricant inlet connected with said pump outlet and two separate lubricant outlets one connected with said crankshaft bearings and the other connected with said other bearings and friction surfaces for separating the lubricant supplied to said crankshaft bearings from the remainder of said lubricant and subjecting said crankshaft bearing lubricant to a cleaning process.

EARLE A. RYDER.